United States Patent
Einbeck

[11] 3,936,241
[45] Feb. 3, 1976

[54] HOUSING SYSTEM FOR GAS TURBINES
[75] Inventor: Harro Einbeck, Nürnberg, Germany
[73] Assignee: Maschinenfabrik Augsburg-Nürnberg Aktiengesellschaft, Nürnberg, Germany
[22] Filed: May 16, 1974
[21] Appl. No.: 470,605

[30] Foreign Application Priority Data
May 17, 1973  Germany............................ 2324880

[52] U.S. Cl. .............. 417/407; 417/360; 417/409
[51] Int. Cl.² ........................................ F04B 17/00
[58] Field of Search ........... 417/406, 407, 409, 360, 417/374

[56]  References Cited
UNITED STATES PATENTS

| | | | |
|---|---|---|---|
| 2,881,972 | 4/1959 | Feilden | 417/409 |
| 3,099,385 | 7/1963 | Elford | 417/406 |
| 3,303,994 | 2/1967 | Morooka | 417/407 |
| 3,411,706 | 11/1968 | Wollenweber, Jr. | 417/407 |
| 3,761,205 | 9/1973 | Val Cronstedt | 417/407 |
| 3,778,194 | 12/1973 | Miller et al. | 417/407 |

FOREIGN PATENTS OR APPLICATIONS

| | | | |
|---|---|---|---|
| 1,306,331 | 9/1962 | France | 417/409 |
| 532,106 | 10/1956 | Canada | 417/406 |

Primary Examiner—C. J. Husar
Attorney, Agent, or Firm—Walter Becker

[57] ABSTRACT

A housing system for gas turbines, especially vehicle gas turbines, according to which in a main housing for a gas turbine there is detachably arranged a housing which includes a bell-shaped bearing housing section provided at its radially largest portion with a cast-on bearing wall, and a compressor housing section and a cover pertaining to the compressor housing section. This cover forms a partition between the compressor intake chamber and the transmission chamber in the bell-shaped bearing housing section. When viewing in the direction toward the bell-shaped bearing housing section, the cover is preceded by the compressor housing section, and the compressor housing section and the cover and the bearing housing section are successively and detachably connected to the main housing and coaxially guided and centered thereby.

8 Claims, 1 Drawing Figure

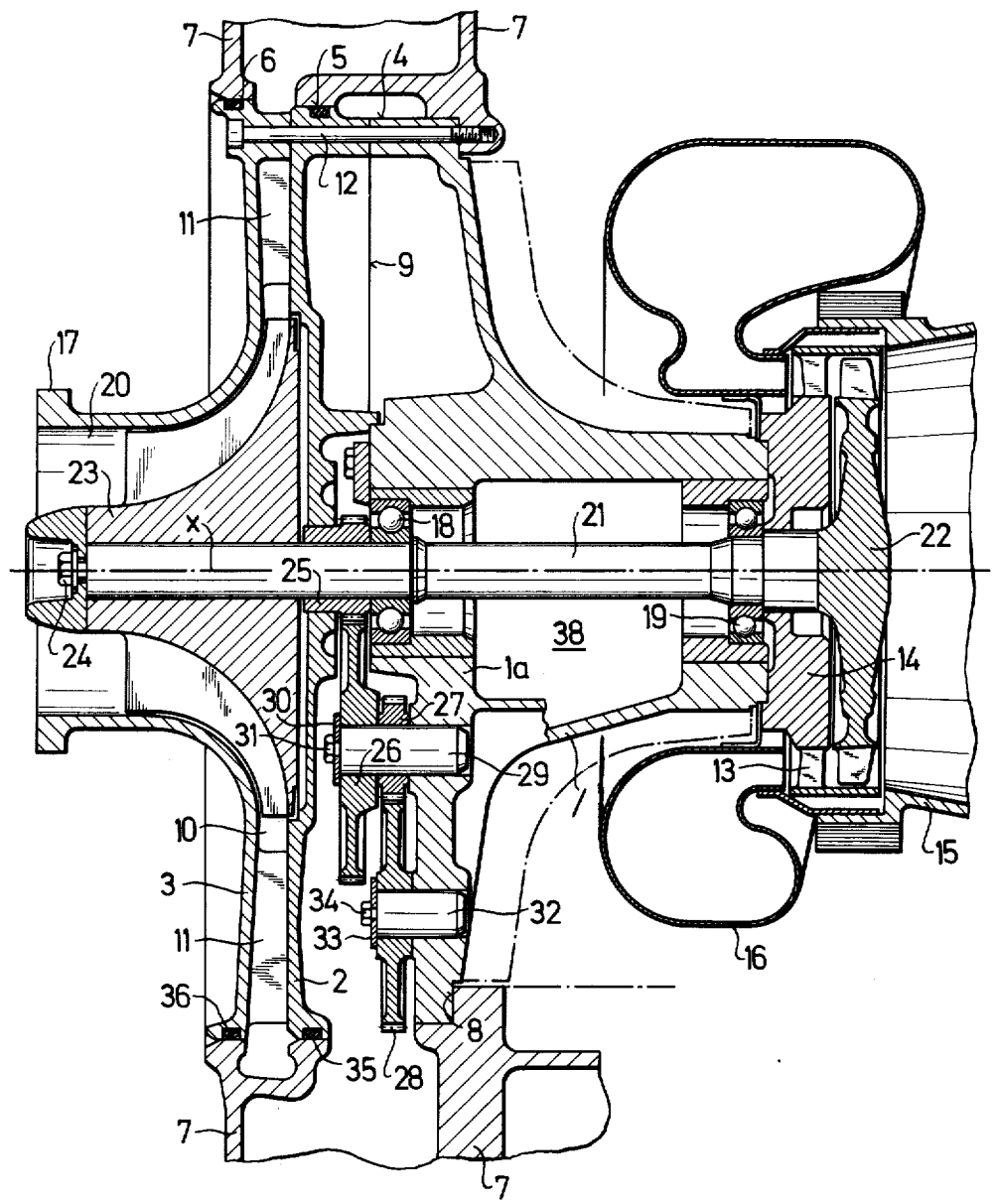

HOUSING SYSTEM FOR GAS TURBINES

The present invention relates to a housing of a gas generator for gas turbines, especially for vehicle-gas turbines, which is arranged at least partially in a main housing of the gas turbine and comprises at least a bell-shaped widening portion and a cover. In the housing there is arranged at least one radial compressor with its bearing means, the bearing means of the gas generator turbine which mechanically drives the radial compressor, and the connecting elements of said gas generator turbine as well as a step-down transmission for driving auxiliary units.

A housing built in this way for a gas generator is described for instance in the periodical "Gas Turbine World" of June, 1972, pages 22–33. With this known housing, the bell-shaped portion is by means of screws connected to an oval cover, the inner wall of which has mounted thereon the air conducting passages for the radial compressor and a loose bearing wall. The oval cover itself which at the same time is to be considered as being a cover for the main housing is flanged onto the main housing from the outside. This oval cover simultaneously forms the outer closure of the compressor. The bearing means for the shaft which on one hand carries the compressor wheel and on the other hand carries the turbine wheel of the gas generator turbine comprises two bearings, one of which is located in the bell-shaped portion whereas the other one is located in the bearing wall connected to the cover.

A gas generator housing of the above mentioned type has a number of drawbacks which become particularly noticeable during the assembly and also in case of repairs becoming necessary. Thus, for instance, above all the mounting of the compressor and turbine shaft and of the gears of the step-down transmission in two different parts requires a particularly high precision during the manufacture of these parts as well as during the later assembly because these two parts have to be machined very precisely. Repairs such as the exchange of the gear, etc., are, therefore, awkward and expensive.

A further drawback of the above known device consists in that the cover is rather large and can be centered only under difficulties. On the other hand, the cover has to have this size in order, in case of need, to be able to exchange the gears for the step-down transmission. In order to permit such exchange, the entire gas generator has first to be disassembled.

It is, therefore, an object of the present invention to provide a housing of a gas generator for gas turbines which while maintaining the necessary precision will be simple in manufacture and can be easily and inexpensively mounted and can be disassembled so that all parts arranged therein which are subjected to wear, can easily be exchanged.

It is a further object of this invention to provide a housing as set forth in the preceding paragraph which can easily and relatively inexpensively be repaired.

These and other objects and advantages of the invention will appear more clearly from the following specification in connection with the accompanying drawing which illustrates a simplified longitudinal section through the housing of a gas generator with the most important parts thereof arranged therein, said housing being built into a main housing indicated only to a minor extent.

The housing according to the present invention which at least partially is arranged in a main housing of the gas turbine and comprises at least one part widening in a bell-shaped manner and a cover, as characterized primarily in that the bell-shaped part of the housing is designed as bearing housing and at that side of its largest radial bulge or extension comprises an additional firmly cast on bearing wall. The housing according to the invention is furthermore characterized in that the cover forms a partition between the compression suction chamber and the transmission chamber provided in the bearing housing. The housing according to the invention is furthermore characterized in that on the cover when viewed in axial direction there is provided a compressor housing part forming the compressor housing and its air conducting passages. The housing according to the invention is finally characterized in that the bearing housing, its cover and compressor housing part are adapted to be inserted into radial guiding means or centering means of the main housing and are connectable while being arranged one adjacent to the other.

The outer surfaces of the bearing housing of the cover and of the compressor housing part which serve for radial guiding and centering are circular in cross section and have nearly the same diameter. The connection of these parts to the main housing is according to the invention effected by means of common screws which pass through bores in all three members and only then are screwed into the main housing.

According to a further development of the invention, it is suggested to provide all bearing areas for the turbine wheel of the gas generator turbine, and for the compressor wheel of the radial compressor as well as for all gears of the step-down transmission, only in the bearing housing and the bearing wall thereof. For purposes of assuring a simplified manufacture and assembly of the gear wheel bearings, it is suggested to design the same in the form of bolts pressed into the bearing wall and to journal the gears thereon in a cantilever fashion. In this way, simultaneously an easier exchange of the gears will be possible. Expediently, at least one of said bearing bolts is so provided as to its length that as the case may be, also two gears connected to each other can be journaled thereon whereby, as is well known, a higher step-down transmission ratio can be obtained, above all, however smaller gears can be selected which will make it possible to design the bearing cover relatively small while nevertheless permit an easy exchange.

By mounting all bearing stations in a bearing housing, the advantage will be obtained that all necessary housing parts can be produced at less expense and in a simple manner. Thus, for instance, when casting the bearing housing, only a central core is required. The cover and the compressor housing part form coreless members which are simple from a casting technological point. These coreless parts can also easily be machined in view of their circular shape at the areas in question. With regard to the precision, no particular requirements have to be met. The dividing of the housing in three parts respectively conforming to a certain function have the advantage that the air conducting passage for the compressor is smooth and without perforations, while no additional sealing areas are required.

A further advantage of the invention, individually seen is due to the design of the bearing areas for the gears, i.e., due to the bearing bolts pressed into the bearing housing. It will be appreciated that the shape of the bearing housing will in this way be simplified, and the precision of the mounting as it is necessary with two bearings need not be taken into consideration, and furthermore the gears can easily be mounted and disassembled.

If repairs are necessary on the step-down transmission, it is merely necessary to loosen only those screws which connect all housing sections together with the main housing, in order to be able to remove the compressor housing part, the compressor wheel, and the cover. Thereupon by respectively loosening a screw, at least one gear can be exchanged. Even the output pinion connected to the compressor and turbine shaft is located ahead of the first bearing station and therefore at any time can, without disassembling the shaft or a bearing, easily be replaced. When assembling the gas generator turbine housing, no specific care has to be taken because all bearing stations are already precisely fixed, and the cover as well as the compressor housing part obtain their precise central position practically by themselves as soon as they are inserted into the main housing. Finally, the design of the housing according to the present invention has further important advantages when for purposes of exchanging the compressor or the turbine shaft or the bearings therefor, it is necessary to remove the bearing housing from the main housing, because the mounting of the gears will in this way not be changed and the recesses for the shaft bearings to be inserted remain likewise fixedly arranged with regard to each other.

Referring now to the drawings in detail, the housing comprises a bell-shaped bearing housing 1 with a bearing wall 1a, a cover 2 and a compressor part 3. The bearing housing 1 as well as the cover 2 and the compressor housing part 3 have in radial direction nearly equally large circular outer surfaces 4, 5, 6 by means of which they are concentrically guided in a main housing 7. Provided in the outer surfaces 5 and 6 of the cover 2 and of the compressor housing part 3, there are radial seals 35, 36 for shutting off of the compressed air which is passed through the air guiding passages 10 into the main housing 7. In axial direction, the bearing housing 1 has its endface engage the main housing 7 while the cover 2 with its endface 9 engages the bearing housing 1, and the compressor housing 3 has its blades 11 provided in the guiding passage 10 engage the cover 2.

The parts 1, 2 and 3 are firmly connected to the housing 7 by means of the common screws 12. Connected to the free end of the bearing housing 1 is a labyrinth housing 14 which is provided for the guiding blades 13 of the gas generator turbine but is not shown in detail. The labyrinth housing 14 is followed by an intermediate diffuser 15 which in this instance leads to a non-illustrated commercial turbine. At the side of the guiding blades 13 around the bearing housing 1 there is provided a spiral 16 from which the gas generated in the combustion chamber is conveyed to the gas generating turbine. At the lower end of the gas generating housing 1, 2, 3, at the compressor housing part 3, there is provided a flange 17 for connecting thereto a non-illustrated air filter or a muffler which may be interposed therebetween. The central axis $x$ of the gas generator housing 1, 2, 3, the outer shape of which forms a body of revolution, simultaneously forms the central axis of a shaft 21 which is journaled in two bearings 18, 19 of the bearing housing 1 and on one hand extends into the labyrinth housing 14 and on the other hand extends through the cover 2 up into the compressor suction chamber 20.

Connected to shaft 21 on one hand is a turbine wheel 22 of the gas generator turbine and on the other hand a compressor wheel 23 of the radial compressor. The wheel 23 is connected by means of a screw 24 which is accessible from the outside. Between the cover 2 and the bearing 18 closest thereto there is provided an output pinion 25 which is mounted on shaft 21. Pinion 25, together with the gears 26, 27 and 28 forms a stepdown transmission for the drive of non-illustrated auxiliary units such as an auxiliary steering pump, transmission control pump, injection device, cooling blower for oil cooler, lubricating pump, drive for heat exchanger, etc. The gears 26 and 27 are firmly connected to each other and are journaled on a bearing bolt 29 in a cantilever fashion, said bearing bolt being pressed into the bearing wall 1a of the bearing housing 1. The gears 26 and 27 are held only by a disc 30 and a screw 31. Similarly, the gear 28 is arranged in a cantilever fashion on a bearing bolt 32 pressed into the bearing wall 1a and is held by a disc 33 and a screw 34. Inasmuch as all bearings and transmission parts are mounted in a transmission housing 1, and since the cover 2 forms a closure, this chamber is called the transmission chamber 28.

The disassembly of the gears 26, 27, 28 or the output pinion 25 is effected by loosening the screw 12, removing the compressor housing 3, loosening the screw 24, removing the compressor wheel 23, removing the cover 2, and loosening the screws 31 or 34. The assembly is, of course, effected in inverse sequence.

It may be mentioned that the drawing shows only those parts which are necessary for the invention and for indicating the advantages obtained by the invention and are shown in a most simple manner. Lubricating passages, air conducting passages, the precise design of the bearings, of the insulating layers, etc, are not shown in order not unnecessarily to clog up the drawings.

It is, of course, to be understood that the present invention is, by no means, limited to the specific showing in the drawings but also comprises any modifications within the scope of the appended claims.

What I claim is:

1. In combination in a gas generation housing system for gas turbines, especially vehicle gas turbines: main housing means for a gas turbine, a gas generator housing arranged at least partially in said main housing means and including an externally bell-shaped section forming a bearing housing and provided at the region of its greatest radial extension with a firmly cast on bearing wall, bearing means arranged in said bearing housing, shaft means rotatably journaled in said bearing means, a turbine wheel mounted at one end section of said shaft means for rotation therewith, a compressor wheel mounted at the other end section of said shaft means for rotation therewith, compressor housing means housing said compressor wheel and defining therewith a compressor suction chamber, said compressor housing means including a wall forming a detachable cover and together with said bearing housing defining a transmission chamber, said compressor housing means aside from said cover and said bearing housing means respectively forming individual sections successively and detachable connected to said main housing means, said main housing means including centering means for coaxially receiving and centering said individual sections, and means for detachably connecting all of said individual sections to said main housing.

2. The combination of claim 1, in which all of said individual sections cover and compressor housing means have radially outer circular surfaces of nearly the same diameter for receiving by said centering means.

3. The combination according to claim 2, which includes radial seals located between said main housing means and the outer circular surfaces respectively of said individual sections.

4. The combination according to claim 3, in which said means for detachably connecting all of said individual sections to said main housing means include screws common to and extending through all of said individual sections and threadedly engaging said main housing means.

5. The combination according to claim 4, in which said turbine wheel and said compressor wheel are supported only by said bearing means in said bearing housing.

6. The combination according to claim 5, which includes additional support means mounted in said cast-on bearing wall, and transmission gear means journaled in said additional support means.

7. The combination according to claim 6, in which said additional support means include bolts pressed into said cast-on bearing wall and a unilaterally projecting portion extending therefrom and respectively supporting said gear means.

8. The combination according to claim 7, in which the projecting portion of at least one of said bolts is so designed as to be able to support in a cantilever fashion two interconnected gears for selectively obtaining a different transmission ratio.

* * * * *